Jan. 15, 1957 D. W. HAGLUND ET AL 2,777,672
PERCUSSION DRILLING BIT
Filed March 22, 1950 2 Sheets-Sheet 1

Inventors
Didrik Wilhelm Haglund,
Stig Per Gustav Hoglund
by Sommers + Young
Attorneys Jan. 15, 1957  D. W. HAGLUND ET AL  2,777,672
PERCUSSION DRILLING BIT Filed March 22, 1950  2 Sheets—Sheet 2

Inventors
Didrik Wilhelm Haglund
Stig Per Gustav Hoglund
by Sommers + Young
Attorneys United States Patent Office 2,777,672
Patented Jan. 15, 1957

2,777,672
PERCUSSION DRILLING BIT

Didrik Wilhelm Haglund and Stig Per Gustav Höglund, Sandviken, Sweden, assignors to Sandvikens Jernverke Aktiebolag, Sandviken, Sweden, a joint-stock company Application March 22, 1950, Serial No. 151,072

Claims priority, application Sweden March 26, 1949

4 Claims. (Cl. 255—64)

The present invention relates to percussion drilling bits of the type comprising one or more cutting inserts accommodated in grooves.

The principal feature and novelty of the invention consists in that the grooves are formed by two or more members fastened to the substantially flat or forward face (considered in the drilling direction) of the body of the bit in such a manner that all the joints between the said members and the bit body are situated under the bottom of the grooves or on the same level therewith.

According to the invention the bottom of the grooves may be formed by the bit body itself or by portions of one or more of the said members or by one or more special members which serve as supports for the cutting insert or inserts respectively.

The grooves of the hitherto known drilling bits are formed in the bit body. This involves that the width of the inserts as well as that of the grooves must be machined to very fine tolerances so as to obtain a suitable fit, which means that the manufacture is rather expensive. This drawback is eliminated by the present invention by forming the groove in which the insert is retained by securing insert-securing members on the substantially flat front face of the bit body with adjacent walls of said members in laterally spaced groove-forming relation.

Another advantage of the invention consists in that the inevitable brazing stresses caused by the brazing of the inserts can be considerably reduced by making the groove-forming parts of a material whose coefficient of temperature expansion is as close as possible to that of the hard metal of which the inserts are made, for instance, nickel alloys can be used.

The invention will now be described more in detail with reference to the accompanying drawings in which preferred embodiments according to the invention are illustrated.

Figure 1:
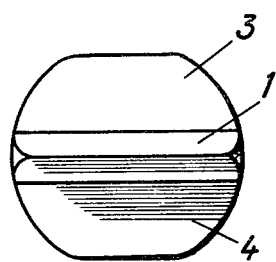
Fig. 1 is an end view of a drilling bit according to the invention, provided with a single cutting insert.
Figure 2:
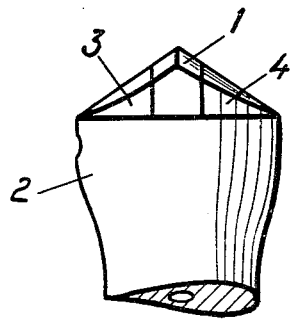
Fig. 2 is a side view of the drilling bit shown in Fig. 1, seen in the longitudinal direction of the insert.

In the embodiment shown in Figs. 1 and 2 the side walls of an elongated groove for an elongated cutting insert 1 are formed by two members 3 and 4 fastened preferably by brazing to the substantially flat front face 21 of the body 2 of the bit, while the bottom of the groove is formed by the said face 2' of the body 2 itself. The insert is likewise preferably fastened by brazing to the members 3 and 4 as well as to the body 2. The inserts are preferably made of hard metal sintered carbides, or the like.

Figure 3:
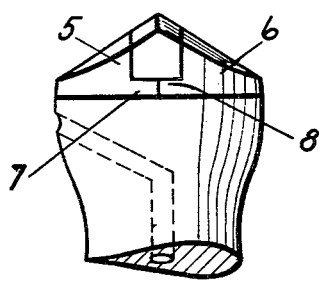
Figs. 3–5 are views, seen in the longitudinal direction of the inserts of other embodiments of the invention.

The embodiment shown in Fig. 3 differs from the embodiment illustrated in Figs. 1 and 2 only through the bottom of the groove being formed by flanges 7 and 8 which are made integral with members 5 and 6 forming the side walls of the groove. The flanges 7 and 8 are preferably interconnected by brazing. In this embodiment also the forward face 2' of the body considered in the direction of drilling, is substantially flat and the insert-securing members 7 and 8 are secured thereto by brazing.

Figure 4:
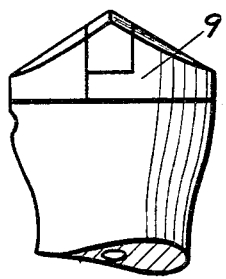

In the embodiment shown in Fig. 4 the bottom of the groove is formed by a flange of only one of the side members, namely that which is designated by 9, and the insert securing members 9 and 9' are secured on the substantially flat forward face 2' of the bit body 2 by brazing.

Figure 5:
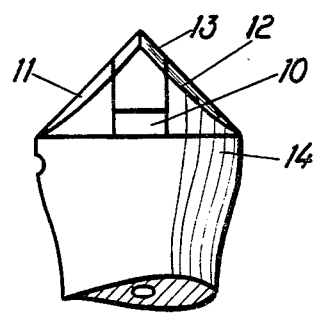

The embodiment according to Fig. 5 has a special member 10 forming a support for the insert 13 and being fastened by brazing to members 11 and 12, forming side walls, as well as to the insert 13 and all three of said members 10, 11 and 12, are secured to the substantially flat forward face 14' of the bit body 14 by brazing.

Figure 6:
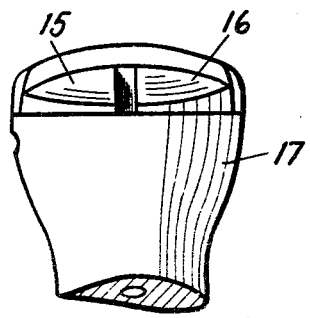
Fig. 6 is a side view of a further embodiment, seen at right angles to the insert.

Fig. 6 illustrates the manner in which each of the side walls of the groove may be formed by two members brazed on the body 17. The members visible in the figure are designated by 15 and 16. In order, additionally, to reduce the brazing strains the said members may be spaced from each other as indicated.

Figure 7:
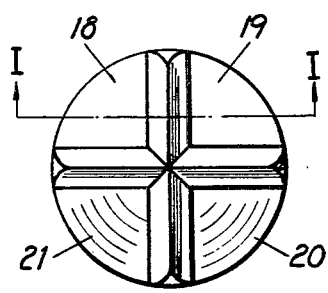
Fig. 7 is an end view of a so called four-point bit according to the invention, i. e. a bit with four cutting edges.
Figure 8:
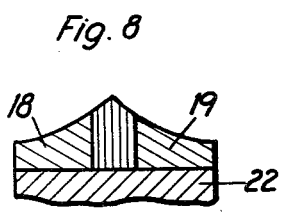
Fig. 8 is a section along the line I—I in Fig. 7.

From Figs. 7 and 8, which show a four-point drilling bit, it will readily be seen that the invention is also adaptable for drilling bits with more than one cutting insert. In this actual case the elongated grooves are formed by four insert-securing members 18, 19, 20, and 21 brazed on the substantially flat forward face 22' of body 22 and are secured to the inserts also by brazing.

Rinsing holes, see the dotted lines in Fig. 3, and other details may be designed in any manner known per se.

It is to be understood that the invention is not limited to the particular embodiments shown and described as many other embodiments are possible within the scope of the invention.

Having now described our invention, what we claim as new and desire to secure by Letters Patent is:

1. A percussion drill bit having a body provided with a substantially flat end face facing in the direction of drilling, at least two separate insert-securing members brazed to said face and arranged beside each other, at least two of said members having side walls facing each other and spaced apart, and forming an elongated groove therebetween, an elongated cutting insert of hard metal sintered carbides in said groove and brazed to said securing members, the width of said groove formed by said securing members being substantially equal to the width of said insert, and said insert-securing members being composed of a material having a coefficient of expansion close to that of the material of said cutting insert.

2. A percussion drill bit having a body provided with a substantially flat end face facing in the direction of drilling, at least two separate insert-securing members brazed to said face and arranged beside each other, at least two of said members having side walls facing each other and spaced apart, and forming an elongated groove therebetween, the bottom of said groove being formed by at least one of said securing members, an elongated cutting insert of hard metal sintered carbides in said groove and brazed to said securing members, the width of said groove formed by said securing members being substantially equal to the width of said insert, and said insert-securing members being composed of a material having a coefficient of expansion close to that of the material of said cutting insert.

3. A percussion drill bit having a body, having a substantially flat end face facing in the direction of drilling, at least three separate insert-securing members brazed to said face and arranged beside each other, two of said members being spaced so as to form the side surfaces of an elongated groove, at least one of said members forming the bottom of said groove, an elongated cutting insert brazed in said groove, the width of the groove formed by said securing members being substantially equal to the width of said insert, said members being placed adjacent to each other rearwardly of the bottom of said groove considered with respect to the drilling direction, said insert being composed of hard metal sintered carbides, said insert-securing members consisting essentially of nickel-alloy having a coefficient of expansion close to that of the material of the cutting insert.

4. A percussion drill bit having a body provided with a substantially flat end face facing in the direction of drilling, at least two initially separate insert-securing members integrally united with said body on said flat end face, and arranged beside each other, at least two of said members having side walls facing each other and spaced apart, and forming a groove therebetween, a cutting insert of hard metal sintered carbides in said groove, the width of said groove formed by said securing members being substantially equal to the width of said insert, said insert being integrally united with said groove-forming insert-securing members, and said insert-securing members being composed of a material having a coefficient of expansion close to that of the material of said cutting insert.

References Cited in the file of this patent

UNITED STATES PATENTS

| | | |
|---|---|---|
| 1,204,805 | MacDonald | Nov. 14, 1916 |
| 1,384,297 | Bernay | July 12, 1921 |
| 1,718,462 | Hardsocg | June 25, 1929 |
| 2,019,934 | Schroter et al. | Nov. 5, 1935 |
| 2,022,194 | Galvin | Nov. 26, 1935 |
| 2,065,898 | Kreag | Dec. 29, 1936 |
| 2,101,864 | McCallum | Dec. 14, 1937 |
| 2,252,745 | Williams | Aug. 19, 1941 |
| 2,474,643 | Webb | June 28, 1949 |
| 2,502,128 | Curtis | Mar. 28, 1950 |
| 2,522,045 | Knowles | Sept. 12, 1950 |

FOREIGN PATENTS

| | | |
|---|---|---|
| 10,750 | Great Britain | May 12, 1903 |
| 203,039 | Great Britain | May 30, 1922 |
| 634,743 | Great Britain | Mar. 29, 1950 |
| 637,237 | Great Britain | May 17, 1950 |
| 669,615 | Great Britain | Apr. 2, 1952 |
| 467,318 | Germany | Oct. 23, 1928 |